United States Patent
Parkinson et al.

(10) Patent No.: US 10,459,778 B1
(45) Date of Patent: Oct. 29, 2019

(54) SENDING MESSAGES BETWEEN THREADS

(71) Applicant: Microsoft Technology Licensing, LLC, Redmond, WA (US)

(72) Inventors: Matthew John Parkinson, Cambridge (GB); Sylvan Wesley Clebsch, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/036,869

(22) Filed: Jul. 16, 2018

(51) Int. Cl.
*G06F 9/54* (2006.01)
*G06F 9/46* (2006.01)

(52) U.S. Cl.
CPC .............. *G06F 9/546* (2013.01); *G06F 9/467* (2013.01)

(58) Field of Classification Search
CPC .................................. G06F 9/546; G06F 9/467
See application file for complete search history.

(56) References Cited

U.S. PATENT DOCUMENTS

| | | | |
|---|---|---|---|
| 5,745,703 | A | 4/1998 | Cejtin et al. |
| 5,875,329 | A | 2/1999 | Shan |
| 8,418,179 | B2 | 4/2013 | Papakipos et al. |
| 8,788,591 | B2 | 7/2014 | Jiang et al. |
| 8,930,526 | B2 | 1/2015 | Franklin |
| 2005/0050305 | A1 | 3/2005 | Kissell |
| 2006/0182137 | A1* | 8/2006 | Zhou ...................... G06F 9/544 370/428 |
| 2010/0115059 | A1* | 5/2010 | Youill ..................... G07F 17/32 709/219 |
| 2012/0084792 | A1 | 4/2012 | Benedek et al. |
| 2013/0081061 | A1 | 3/2013 | Dice et al. |
| 2013/0160026 | A1 | 6/2013 | Kuesel et al. |
| 2013/0298143 | A1 | 11/2013 | Colombo et al. |
| 2013/0326180 | A1 | 12/2013 | Mamidala et al. |

(Continued)

FOREIGN PATENT DOCUMENTS

| | | | | |
|---|---|---|---|---|
| CN | 108737292 | A * | 11/2018 | ........... H04L 12/863 |
| CN | 109151762 | A * | 1/2019 | ............. G07C 5/008 |
| JP | 2006259981 | A * | 9/2006 | ............. G06F 15/00 |
| WO | 2017203320 | A1 | 11/2017 | |

OTHER PUBLICATIONS

Ban, Bela, "Reliable group communication with JGroups", Retrieved from: http://www.jgroups.org/manual4/, Retrieved Date: May 30, 2018, 180 Pages.

(Continued)

*Primary Examiner* — Charles E Anya

(57) ABSTRACT

A method of communicating messages between threads. For each thread there are defined M buckets. When a transmitting thread has a message to send, it assigns the message to the bucket numbered $m=\text{Tid}\_r \bmod M$ to await transmission, where Tid_r is the ID of the receiving thread. The bucket $m=\text{Tid}\_t \bmod M$ is the home bucket, where Tid_t is the ID of the transmitting thread. After accumulating multiple messages, a batch transmission is performed, comprising a plurality of successive phases p. Each phase comprises: i) from each bucket other than the home bucket, transmitting some or all of the messages in the bucket as a batch to one of the receiving threads of the bucket, and ii) except in the last phase, incrementing the phase p by 1, and redistributing the messages remaining in the home bucket according to $m=(\text{Tid}\_r/M^p) \bmod M$.

19 Claims, 3 Drawing Sheets

(56) References Cited

U.S. PATENT DOCUMENTS

| | | | |
|---|---|---|---|
| 2014/0304246 A1 | 10/2014 | Helmich et al. | |
| 2016/0092273 A1* | 3/2016 | Reed | G06F 9/466 |
| | | | 718/101 |
| 2016/0179591 A1 | 6/2016 | Arimilli et al. | |
| 2016/0294784 A1* | 10/2016 | Hopkins | H04L 63/0428 |
| 2017/0293499 A1* | 10/2017 | Che | G06F 9/4552 |
| 2017/0357540 A1* | 12/2017 | Rutz | G06F 9/546 |
| 2018/0183895 A1* | 6/2018 | Shuler | H04L 67/32 |
| 2018/0365049 A1* | 12/2018 | Rafiee | G06F 9/466 |

OTHER PUBLICATIONS

Galpin, Morgan, "MirrorMaker Performance Tuning", Retrieved from: https://engineering.salesforce.com/mirrormaker-performance-tuning-63afaed12c21, Sep. 26, 2017, 7 Pages.

Cheng, et al., "BlitzG: Exploiting High-Bandwidth Networks for Fast Graph Processing", In Proceeding of IEEE Conference on Computer Communications, May 2017, 9 Pages.

Dang, et al., "Eliminating Contention Bottlenecks in Multithreaded MPI", In Journal of the Parallel Computing vol. 69, Jan. 16, 2017, 23 Pages.

"International Search Report and Written Opinion Issued in PCT Application No. PCT/US2019/037404", dated Aug. 8, 2019, 14 Pages.

Zhang, et al., "Parallel Optimization of Frequent Algorithm on Multi-core Processors", In Proceeding of International Conference on Control Engineering and Communication Technology, Dec. 7, 2012, pp. 295-299.

\* cited by examiner

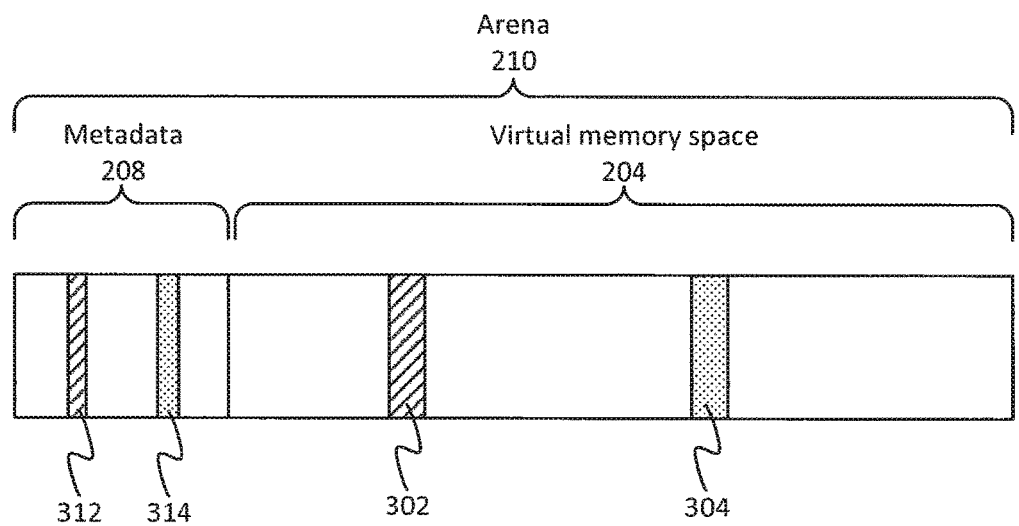
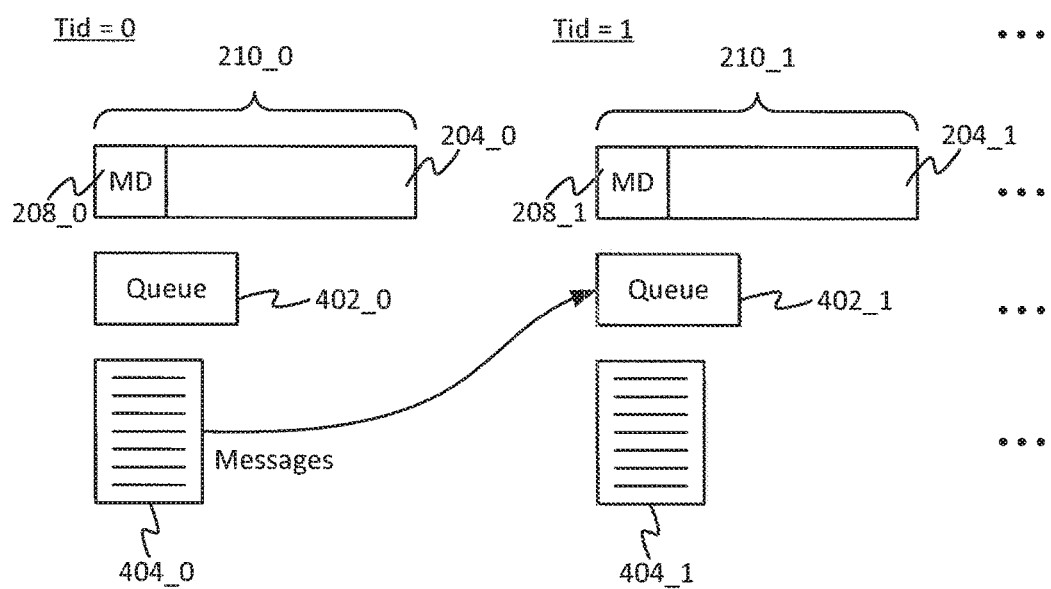

SENDING MESSAGES BETWEEN THREADS

BACKGROUND

Threads are portions of code which can, at least for a time, be run independently of one another, and which can be run concurrently or in parallel with one another. Concurrency refers to the case where threads are interleaved with one another through the same execution unit of a processor, thus providing an effectively simultaneous form of execution. Parallelism refers to the case where threads are executed truly simultaneously through different parallel execution units of the same processor. In a given program or set of programs, two or more threads of the program may be run concurrently and/or in parallel at any one time, depending on the resources of the system.

Threads can take the form of hardware threads or software threads. In the case of hardware threads, the processor itself comprises hardware support for each thread, at least in the form a set of context registers for each of the threads that can be run concurrently or in parallel at any one time. Each set of context registers stores a program state of a respective thread, such as the program counter and operands. In the case of software threads, the concurrency or parallelism is achieved not (or not only) though hardware support for each thread, but rather the thread states are maintained at a higher level in software. Either way, in many cases the threads may be scheduled for execution by the operating system running on the computer system. The threads in question may comprise threads of the operating system itself or threads of one or more applications run on the operating system.

One task which a thread may perform is memory allocation and deallocation. Typically the operating system comprises a memory page table which maps a physical memory space of one or more physical memory devices to a virtual address space. From amongst this virtual address space, a software process can allocate one or more blocks of memory to be made available to the software for performing a particular task or tasks. Metadata is associated with the virtual address space in order to record which blocks are currently allocated. The data structure comprising the virtual memory space and the metadata is sometimes referred to as the "arena". When blocks of the virtual memory space are no longer needed, the software should make sure it de-allocates the blocks to be made available for other tasks.

In a multi-threaded program or set of programs, each thread may comprise its own instance of a memory allocator for allocating and deallocating blocks of memory. This results in contention, i.e. competition for the same resource (the metadata). This contention needs to be resolved since only one thread should be allowed to manipulate the metadata at any one time. To achieve this, conventional techniques use a system of "locks", whereby when a thread is accessing the arena to change the metadata, it acquires a lock on the metadata to prevent any other threads manipulating the metadata at the same time.

SUMMARY

However, the lock results in a lot of latency while threads wait around for another thread's lock to be lifted so they can access the arena metadata themselves in order to allocate or deallocate memory resources. The locking and unlocking mechanism also adds latency in its own right. It would be desirable to provide a lock-free mechanism for resolving resource contention between threads.

To address this, embodiments assign a separate arena per thread and then use the following batch messaging method to enable one thread to request another thread to de-allocate memory from its arena.

More generally, it has been recognized that the disclosed batch messaging method can be used in any type of messaging between threads, e.g. for communicating between threads running on different wireless devices over a network, where each device can only turn on its wireless transmitter at intervals.

According to one aspect disclosed herein, there is provided a computer-implemented method of communicating messages between threads, each thread having a thread identifier number Tid, the method comprising:

for each of the threads, defining a data structure comprising a plural number M of buckets having a sequential numbering m; and for each transmitting one of said threads, using its M buckets:

each time the transmitting thread has a message to send or forward to any receiving one of said threads Tid_r, assigning the message to the bucket numbered m=Tid_r mod M to await transmission, where Tid_r is the thread identifier number of the receiving thread;

identifying the bucket numbered m=Tid_t mod M as a home bucket, where Tid_t is the thread identifier number of the transmitting thread;

after accumulating multiple messages in the buckets, performing a batch transmission comprising a plurality of successive phases p starting at p=0, each phase comprising:

i) from each bucket other than the home bucket, transmitting some or all of the messages in the bucket as a batch to one of the receiving threads in the bucket, and ii) except in the last phase, incrementing the phase p by 1, and redistributing the messages remaining in the home bucket according to m=(Tid_r/M$\hat{\text{1}}$p) mod M;

wherein each receiving thread places any messages it receives not destined for itself into one of its own M buckets according to m=Tid_r mod M for forwarding.

In embodiments the method may comprise operations in accordance with any of the embodiments disclosed herein.

According to another aspect disclosed herein there is provided software (e.g. an operating system) embodied on a computer-readable medium and configured so as when run on one or more processors to perform operations in accordance with any of the methods disclosed herein.

According to another aspect disclosed herein, there is provided a computer system comprising one or more processors and memory comprising one or more memory units arranged to store code arranged to run on the one or more processors, the code being configured so as when run to perform operations in accordance with any of the methods disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments disclosed herein and to illustrate how such embodiments may be put into effect, reference is made, by way of example only, to the accompanying drawings in which.

DETAILED DESCRIPTION OF EMBODIMENTS

Figure 1:
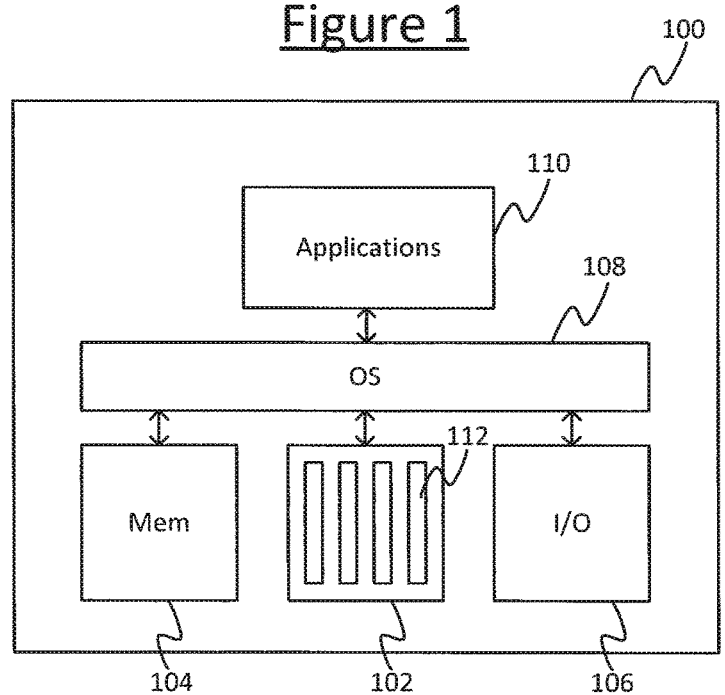
FIG. 1 is a schematic block diagram of a computer system.

FIG. 1 shows a computer system 100 in accordance with embodiments disclosed herein. The computer system 100 comprises: processing apparatus 102, memory 104, and one or more I/O devices 106. The memory 104 stores an operating system 108 and one or more applications 110. The operating system 108 is arranged to run on the processing apparatus 102, and the one or more applications 110 are arranged to run on the operating system 102 on the processing apparatus 102. The operating system 108 is configured to schedule the application(s) 110 for execution and to mediate access to the memory 104 and I/O resources 106 by the application(s) 110.

The memory 104 is also operable to store data to be accessed or operated on by the operating system 108 and/or application(s) 110, or to store data resulting from operations performed by the operating system 108 and/or applications 110. The memory 104 on which the operating system 108, application(s) 110 and data are stored may comprise one or more memory devices employing one or more memory media, e.g. electronic memory such as flash memory or a solid state drive (SSD); or a magnetic memory such as a hard-disk dive (HDD). Each of the operating system 108, applications 110 and data may be stored on a single memory device or distributed across multiple memory devices. The program code of the operating system 108 and applications 110 and data may be stored in different regions of the same one or more memory devices as the data, or on a different one or more memory devices than the data. Similarly, the operating system 108 may be stored in different regions of the same one or more memory devices as the applications 110, or a different one or more memory devices; and in the case of multiple applications 110 these may be stored in different regions of the same or more memory device, or some or all of them may be stored in different one or more memory devices than each other. The memory device(s) may be internal to the same housing as the processing apparatus or be external to it, or may comprise a combination of internal and external devices.

The processing apparatus 102 is arranged to run multiple concurrent or parallel threads 112. These may be threads of the operating system 108 itself and/or threads of one or more of the applications 110. The processing apparatus 102 on which the operating system 108 and application(s) 110 are run, including the threads 112, may comprises one or more processors comprising one or more cores. In the case of multiple processors these may be implemented on the same computer terminal or distributed across multiple computer units at multiple computer units at different locations, e.g. different chassis in the same data centre, different terminals on the same local area network, or different geographic locations networked together via a wide-area network such as the Internet.

For instance, the threads 112 may comprise: different threads on a same processor core, threads on different processor cores, threads on different cores on the same die or IC package, threads on different IC packages in the same board, threads on different boards connected together in a same data centre, threads on different devices connected together over a local-area and/or wide-area network (e.g. the Internet or a mobile cellular network such as a 3GPP network), or any combination of these. Note therefore that in some embodiments the operating system 108 may take the form of a distributed operating system. Also, in embodiments the memory 104 may comprise multiple memory devices distributed across multiple locations. Where desired, distributed computing techniques in themselves are known in the art.

Figure 2:
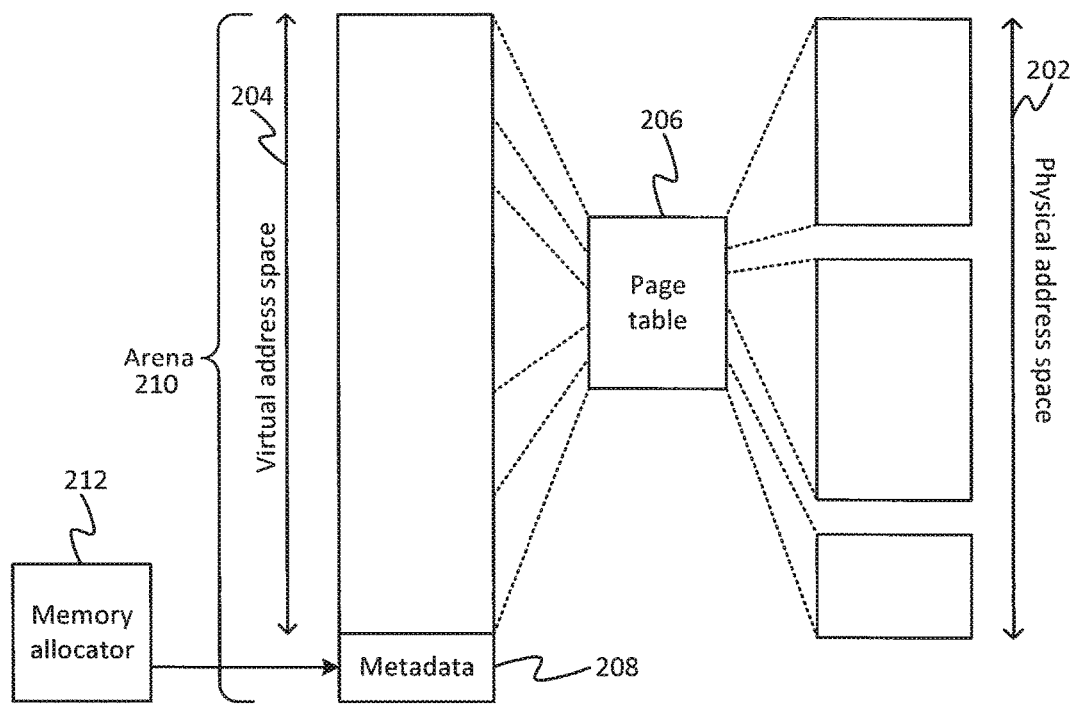
FIG. 2 schematically illustrates a mapping of physical to virtual memory spaces, FIG. 3 schematically illustrates a method of memory allocation scheme, FIG. 4 schematically illustrates a method of communicating between threads, and FIG. 5 schematically illustrates further example details of method of communicating between threads.

FIG. 2 illustrates a memory mapping an allocation scheme that may be employed by the operating system 108 to manage access to the memory 104 or at least parts thereof. The memory 104 comprises a physical address space 202 across one or more memory devices, i.e. the actual hardware addresses by which the physical regions of memory in those one or more memory devices are addressed. The physical memory space 202 in question may comprise a memory space of one or more volatile memory devices (RAM) and/or one or more non-volatile memory devices (e.g. flash, SSD or HDD).

The operating system 108 comprises a memory page table 206 which maps the physical addresses of the physical address space 202 onto corresponding virtual addresses of a virtual address space 204. The operating system 108 also maintains a portion of metadata 208 associated with the virtual memory space 204. This metadata 208 is used for "book keeping", to record which blocks of the virtual memory space 204 are allocated for which software tasks. Together the virtual memory space 204 and the associated metadata 208 are referred to as an "arena" 210. A component known as a memory allocator 212 is responsible for recording in the metadata 208 that a specified block or blocks or the virtual memory space 204 is/are to be reserved, so they can be used for a certain task. An example is shown in FIG. 3 whereby a first entry 312 in the metadata 208 records that a first block of memory 302 in the virtual memory space 204 is currently allocated, and a second entry 314 in the metadata 208 records that a second block of memory in the virtual memory space is also currently allocated (it will be appreciated that this is just of illustration an in practice there may be many more reserved blocks and corresponding entries in the metadata). The memory allocator 212 can also de-allocate the block(s) again at the end of the task using that space, by removing the association recorded in the metadata 208, in order to thereby release that memory space for use in performing other, future tasks. Note that the metadata 208 does not need to record what tasks the blocks are allocated for, just the fact that they are currently allocated, so that they cannot be used by another task until released.

The page table 206 and arena 210 take the form of data structures which may be implemented in any one or more memory devices of the memory 104. The memory allocator 212 may be a component of the operating system 108 or the application(s) 110.

In a multi-threaded environment, each of multiple threads 112 may comprise its own respective instance of a memory allocator 212. This can result in contention, i.e. competition for the same resource by different entities—in this case competition for access to the metadata 208 by the allocators 212 of the different threads 112. For the system 100 to function properly, it should not be allowed that different threads 112 try to manipulate the metadata 208 of the same arena 210 at the same time.

The conventional solution is to implement a lock on the arena 210 (or more specifically a lock on access to the metadata 208). That is, when the allocator 212 of one thread 112 wishes to access the metadata 208 to manipulate it (to allocate or deallocate one or more blocks) then the thread in question acquires a lock on the metadata 208. This prevents any other threads 112 accessing the metadata 208 until the thread that acquired the lock releases the lock again.

An issue with this however is that it results in a lot of latency (i.e. delay): threads have to wait a lot for access to the metadata 208. Put another way, the lock creates a "bottleneck" in the allocation and deallocation of memory.

An alternative solution would be to provide each thread 112 with its own separate respective arena, each comprising a different respective virtual memory space and associated metadata. However, this in itself will bring issues: either one has to reserve a wastefully large amount of memory space for each thread 112 (not desirable), or else it is necessary to provide a mechanism whereby one thread 112 can request another thread 112 to deallocate memory back to that other thread's own arena. In the latter case, the messaging between threads 112 to enable such requests will in itself incur a performance cost in terms of time.

Embodiments of the present disclosure provide an efficient message scheme for sending requests for memory deallocation between threads.

FIG. 4 illustrates the assignment of a separate arena 210_0, 210_1, . . . to each of a plurality of threads 112, the threads being assigned thread identifiers Tid=0, 1, . . . respectively. Each arena 210_0, 210_1, . . . comprises a respective portion 204_0, 204_1, . . . of the virtual memory space 204 (mapped from the physical address space 202 by the page table 206). Each arena 210_0, 210_1, . . . also comprises a respective portion of metadata 208_0, 208_1, . . . for recording which blocks of the memory space 204_0, 204_1, . . . of the respective arena are currently allocated (in a similar manner as described above, but for the individual arena).

Each thread 112 (Tid=0, 1, . . . ) comprises a respective instance of a memory allocator 212, configured to allocate and deallocate blocks of the respective memory space 204_0, 204_1, . . . of the respective arena 210_0, 210_0, . . . of the respective thread, by accessing and manipulating the respective of metadata 208_0, 208_1, . . . of that arena and thread. The memory allocator, like the rest of the thread, takes the form of software code stored on a part of the memory 104 and arranged to run on the processing apparatus 102.

Each thread's arena 210_0, 210_1, . . . comprises a respective memory space 204_0, 204_1, . . . over which that particular thread has responsibility for allocating and deallocating memory for certain tasks or purposes. Once allocated, the allocated block(s) can be used by any of the threads; but only the respective thread 112 (Tid=0, 1, . . . ) can allocated and deallocate memory from its own respective memory space 204_0, 204_1, . . . of its own respective arena 210_0, 210_1, . . . . This prevents contention in the access to the metadata 208, since for each portion of 208_0, 208_1, . . . associated with each arena 210_0, 210_1, . . . , then only the memory allocator of one thread can access that metadata.

This means that if one thread 112 (e.g. Tid=0) wants to cause memory to be deallocated back to the arena of another thread 112 (e.g. arena 210_1 of Tid=1), then it needs to send a message asking the other thread to do this.

To implement this, each thread 112 (Tid=0, 1, . . . ) is associated with a respective queue 402_0, 402_1, . . . . The queues 402 take the form of data structures in part of the memory 104. In embodiments the queues 402 are part of the operating system 108. During the running of each thread 112, the thread may generate a respective one or more messages 404_0, 404_1, . . . to send to one or more of the other threads. For the present purposes, the thread identifier of a transmitting (sending) thread will be labelled Tid_t and the thread identifiers of the corresponding receiving thread(s) will be labelled Tid_r. It will be appreciated of course that any given thread 112 may be both a transmitting and receiving thread, but for the sake if illustrations and discussion, the process may be described from the perspective of one thread Tid_t transmitting to one or more receiving threads Tid_r.

When the transmitting thread (e.g. Tid_t=0) has a message 404 to send to another, receiving thread (e.g. Tid_r=1), requesting the receiving thread to deallocate memory back to its respective arena (e.g. 210_1), then the transmitting thread Tid_t sends the message to the queue 402 of the receiving thread Tid_r (e.g. 402_1). The queue 402 is a queue of memory deallocation request messages from one or more other threads 112, queued up for the receiving thread Tid_r to process (these could also include requests from other transmitting threads, or multiple requests from the same transmitting thread, or both). Thus there is provided a mechanism whereby each thread 112 is responsible for allocating and deallocating blocks of its own respective memory space 204_0, 204_1, . . . in its own separate respective arena 210_0, 210_1, . . . ; but at the same time, threads 112 can message between one another to enable one thread to request another to deallocate some of that other thread's memory space.

Figure 5:
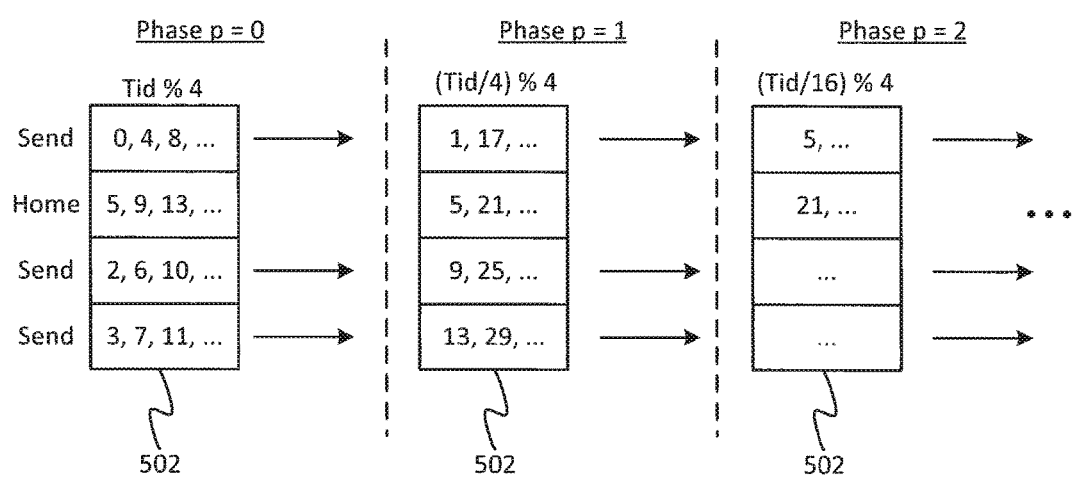

However, the sending of a message between threads 112 incurs performance cost due to the time it takes to send the message. FIG. 5 illustrates an example of a scheme in accordance with embodiments disclosed herein for messaging between threads with increased performance. The scheme exploits the fact that it is more efficient to send messages in batches: the performance cost incurred by sending one message is the same as sending a batch of multiple messages. The cost of sending a single message is the same as a batch, as a single atomic instruction can be used for sending a batch by forming them into a linked list.

To implement the messaging scheme, a respective set of M "buckets" 502 is associated with each thread. FIG. 5 illustrates the M buckets 502 for a given one of the threads 112, in this example Tid=1, over a plurality of successive temporal phases (to be discussed in more detail later). In the example illustrated M=4, but more generally M could be any plural number. In embodiments M is preferably at least 4, and may in practice be much higher (e.g. 64). Each set of buckets 502 takes the form of a data structure stored in part of the memory 104. In embodiments the buckets 502 are part of the operating system 108. The messaging scheme operates as follows. The scheme may be described a peer routing scheme with the threads being the peers. In embodiments the messaging may be conducted via the operating system 108. Examples may be described from the perspective as a particular one of the threads 112, e.g. Tid=1, as the transmitting thread, but it will be appreciated that each of the threads 112 is configured to both transmit and receive messages according to the same scheme.

As mentioned, each thread 112 is assigned a respective thread identifier Tid which is a number identifying that thread. Further, for each of the threads 112, there is defined a respective instance of a data structure 502 comprising a plural number M of "buckets", the buckets being sequentially numbered m=0, 1, 2, . . . M–1 (in the embodiments illustrated m starts at zero but as will become apparent, equivalently any sequence of M consecutive values could be used, e.g. m=1, 2, 3, . . . M; or m=3, 4, 5, . . . 3+M; etc.).

For each transmitting one of said threads 112, the thread uses its M buckets 502 to perform the following process. For a given transmitting thread, the process operates over a plurality of successive phases p in time, where p=0, 1, 2, . . . For the sake of illustration this will be exemplified in terms of transmitting thread Tid=1. Each transmitting thread begins in an initial phase p=0, which operates as follows.

Each time the transmitting thread Tid_t has a message to send to any receiving one of said threads Tid_r, the message is assigned to the bucket numbered m=Tid_r mod M to await transmission, where Tid_t is the thread identifier of the transmitting thread, Tid_r is the thread identifier number of the receiving thread, and "mod" is the modulus (i.e. the remainder after dividing Tid_r by M). This applies equally to any messages the transmitting thread has received from any other threads that are not destined for the transmitting thread, and which the transmitting thread has to forward (to be discussed in more detail shortly). As will also be discussed in more detail shortly, the more generalized formula for distributing outgoing messages amongst the buckets 502 is m=(Tid_r/M^p) mod M (where ^ signifies "raised to the power of"), but in the initial phase p=0 so in this case the formula equals Tid_r mod M.

The bucket numbered m=Tid_t mod M is also identified as a "home" bucket. The meaning of this will become more apparent shortly.

The initial assignment of outgoing messages to buckets is illustrated by way of example in FIG. 5. Here Tid=1 is exemplified as the transmitting thread Tid_t. Say the thread Tid_t=1 has outgoing messages to send to various other threads such as Tid_r=0, 2, 3, 4, 5, 6, 7, 8, 9, 10, 11, 12, 13, etc. Messages destined for Tid_r=0, 4, 8, etc., are placed in bucket m=0 since the remainder after dividing each of these thread IDs by the number of buckets M is 0. Messages destined for Tid_r=5, 9, 13, etc., are placed in bucket m=1 since the remainder after dividing each of these thread IDs by the number of buckets M is 1. Messages destined for Tid_r=2, 6, 10, etc., are placed in bucket m=2 since the remainder after dividing each of these thread IDs by the number of buckets M is 2. Messages destined for Tid_r=3, 7, 11, etc., are placed in bucket m=3 since the remainder after dividing each of these thread IDs by the number of buckets M is 3. The buckets 502 act to buffer the outgoing messages, so as to await transmission as a batch.

The "home" bucket is that for which m=Tid_t mod M, i.e. the bucket number equal to the remainder after dividing the transmitting thread's own ID by the number of buckets M. However, no messages for the transmitting thread go in this bucket. In the case where the messages correspond to request for memory deallocation to be performed by other threads on their own respective arena 210_0, . . . , then any deallocations to performed on the transmitting thread's own arena 210_1 are handled by the transmitting thread straight away and do not go into any of the buckets 502.

After accumulating multiple messages in the various buckets 502, then a batch transmission is performed to transmit the multiple waiting messages from the transmitting thread Tid_t as a batch. This batch transmission comprises a plurality of successive phases p starting from the initial phase p=0. Each phase comprises two steps, labelled herein i) and ii).

The first step i) comprises: from each bucket 502 other than the home bucket, transmitting some or all the messages in the bucket (preferably all) as a batch to one of the receiving threads Tid_r in the bucket. So in the example illustrated, all the messages waiting in bucket m=0 are transmitted to one (and only one) of the receiving threads Tid_r=0, 4 or 8, etc. This could be to any of the receiving threads. By way of implementation, in embodiments then for each bucket 502 of each transmitting thread tid_t, the messages to be transmitted from that bucket are assigned to the bucket in an order in which they become available for transmission (e.g. as-and-when they are generated by the transmitting thread Tid_t or received for forwarding); and said one of the receiving threads in operation i) is the receiving thread Tid_r to which the first message in the bucket is destined according to said order. That is, the outgoing messages are placed into their respective bucket in the order in which they become available for transmission of forwarding, and the receiving thread Tid_r to which the first outgoing message in the bucket is destined, is the thread which receives all the messages from that bucket (even those still destined for another onward thread). So in the example shown, if the first message in bucket m=0 is a messaged for receiving thread Tid_r=4, then all the outgoing messages in bucket m=0 are sent to receiving thread Tid_r=4. Any such messages not ultimately destined for Tid_r=4 will get forwarded by thread 4 according to the same scheme the next time it performs its own batch transmission.

To continue the example, all the messages waiting in bucket m=1 are transmitted to one (and only one) of the receiving threads Tid_r=5, 9 or 13, etc. All the messages waiting in bucket m=2 are transmitted to one (and only one) of the receiving threads Tid_r=2, 6 or 10, etc. All the messages waiting in bucket m=3 are transmitted to one (and only one) of the receiving threads Tid_r=3, 7 or 11, etc. In embodiments, all the outgoing messages in all the buckets 502 except the home bucket are transmitted together as a batch. As discussed, this advantageously reduces the time cost in messaging between threads. In variants it is not excluded that the outgoing messages in each given bucket are transmitted together as a batch on a per bucket basis, but not as a whole across all the buckets. This will still provide some time saving.

The second step ii) then comprises (except in the last phase): incrementing the phase p by 1, and redistributing the messages remaining in the home bucket according to m=(Tid_r/M^p) mod M. That is, to find the new bucket for each remaining outgoing each message: determine the value of M raised to the power p, and divide Tid_r by that value; then determine the remainder after dividing the result of that by M. Thus the remaining messages are spread out amongst the buckets 502.

Steps i) and ii) repeat over multiple phases p=1, 2, . . . until all the messages for the transmitting thread Tid_t in question have been sent. For a larger number of buckets than shown (e.g. 64), then of the order of hundreds of messages can be sent over only a relatively small number of phases p (e.g. for M=64 and p=1 can address 64 recipients, for M=64 and p=2 can address 4096 recipients, and generally can address M^p recipients).

The above process is performed separately for each thread (the batch transmission is for a batch of messages from a given transmitting thread). Since each thread 112 is performing the process individually, then when a group of messages is send from the transmitting thread Tid_t to one of the receiving threads Tid_r, any that are not ultimately destined for that one of the receiving threads will be forwarded onwards according to the same transmitting process as described above. I.e. Each receiving thread places any messages it receives not destined for itself into one of its own M buckets according to m=Tid_r mod M for forwarding. For example, consider the case where the first message in bucket m=0 of Tid_t=1 is destined for Tid_r=4, and so when the batch transmission from thread Tid_t=1 occurs in phase p=0, all the messages in that bucket destined for all of threads Tid_r=0, 4, 8, . . . are transmitted from thread Tid_t=1 to thread Tid_r=4. Because the receiving thread Tid=4 is also a transmitting thread from the perspective of its own transmitting process, it will distribute all the messages not destined for itself amongst its own set of buckets for forwarding. Then when thread Tid=4 next triggers its own batch transmission at some later time, it will forward these messages onwards in exactly the same way as described for the first thread Tid=1, and so forth. Note that the batch transmissions of the different threads do not need to be synchronized since they messages will simply be forwarded the next time a batch transmission is triggered at each thread in the chain.

Referring still to the example of FIG. 5, a similar chain of events occurs for the messages destined for threads 1, 17, . . . from bucket m=0 in phase p=1; and the messages destined for threads 2, 6, 10, . . . from bucket m=2 in phase p=0; etc.

Thus the phase p may also be thought of as a radius or number of hops from the originating thread of the message.

The batch transmission will occur after a number of messages have built up in the buckets, but the actual trigger for triggering the batch transmission could be configured to be any of a number of different options (and again, the triggers for the transmission from the different threads 112 need not be synchronized, though that possibility is not excluded either). In some embodiments, the batch transmission may be triggered by a total number of messages in the buckets of the transmitting thread Tid_t exceeding a threshold number (e.g. 1000 messages across all the outgoing buckets of that thread.). Alternatively, the batch transmission is triggered by a predetermined time period expiring. E.g. the batch transmission could be triggered periodically (i.e. at regular intervals). As another example, the batch transmission from a given thread could be triggered randomly.

Saving up messages to transmit as a batch is advantageous since the time cost of sending one message is the same as that incurred by sending a batch of messages. Sending messages too often therefore incurs a greater overall time penalty in terms of transmission. On the other hand waiting too long to send the messages may also incur a time penalty in the program itself (e.g. waiting too long to free up memory or allocate may prevent the program from getting on with new tasks). There is also another type of penalty in terms of storing up large amounts of unused memory not yet deallocated. The preferred balance between the number of messages to save up per batch and the frequency of transmission may be application dependent, and hence the exact trigger for batch transmission may be a matter of design choice.

In embodiments each of the messages comprises a request from the transmitting thread Tid_t to the receiving thread Tid_r for the receiving thread to deallocate one or more of the blocks currently allocated in the receiving thread's respective arena 210_Tid_r. For instance in one example use case, the threads 112 may comprise threads of a distributed garbage collection system (an automatic memory management function for identifying and deallocating allocated memory blocks that are no longer in use). The garbage collector could be part of the operating system 108 or a separate program 110 run on the operation system 108.

In embodiments, when a thread is to deallocate a block or blocks of its own memory, this deallocation is performed directly by the thread itself as-and-when required, rather than being queued amongst the requests for deallocations from other threads in the respective receiving queue 402. This may be preferred as it is cheaper for the thread's own deallocations. However it is not excluded that in other embodiments the thread's own deallocation tasks could be queued up along with the allocations requested by other threads in the same queueing mechanism 402.

In embodiments, the described messaging scheme is only used for requests for memory deallocation, not requests for memory allocations; the reason being that it can be tolerable to if deallocation is delayed somewhat, but if allocation is not performed straight away then the program cannot progress. However, in other embodiments it is not absolutely that the same messaging scheme is used for allocation.

Further, the scope of the disclosed techniques however is not limited to memory management, and could be used for any kind of messaging between threads. In general the threads 112 could be threads of any software and the messages 404 could be for any purpose. For instance, in another example use cases each of the threads 112 may correspond to a different respective IP address of a different respective one of a plurality of wireless devices, such as sensor devices, connecting together over a network each via a wireless connection to that network. The network may for example comprise a wide-area network such as the Internet or a mobile cellular network (e.g. 3GPP network). The devices in question may for example be "Internet of Things" (IoT) devices, such as IoT sensors. Such wireless devices may be configured to power up their wireless transceivers (e.g. radios) for only a certain amount of time at certain regular or irregular intervals. The disclosed messaging scheme can also be useful in such scenarios for storing up messages to send as batches. For instance, there may be costs that are similar for sending one or many messages, e.g. leaving a low power state is expensive.

It will be appreciated that the above embodiments have been described by way of example only. Other applications or variants of the disclosed techniques may become apparent to a person skilled in the art once given the disclosure herein. The scope of the present disclosure is not limited by the above-described embodiments but only by the accompanying claims.

The invention claimed is:

1. A computer-implemented method of communicating batched messages between threads, each thread having a thread identifier number (Tid), the method comprising:

for each of the threads, defining a data structure comprising a plural number (M) of buckets having a sequential numbering (m);

for each transmitting one of said threads, using its M buckets, wherein M is at least 2;

each time the transmitting thread has a message to send or for arc to any receiving one of said threads (Tid_r), assigning the message to the bucket numbered m=Tid_r mod M to await transmission, wherein Tid_r is the thread identifier number of the receiving thread;

identifying the bucket numbered m=Tid_t mod M as a home bucket; wherein (Tid_t) is the thread identifier number of the transmitting thread; and after accumulating multiple messages in the buckets, performing a batch transmission comprising a plurality of successive phases (p) starting at p=0, each phase comprising:
  i) from each bucket other than the home bucket, transmitting some or all of the messages in the bucket as a batch to one of the receiving threads of the bucket based on the assignment of the bucket numbered m=Tid_r mod M, and
  ii) except in the last phase, incrementing the phase p by 1, and redistributing the messages remaining in the home bucket according to m=(Tid_r/M^p) mod M, wherein each receiving thread places any messages it receives not destined for itself into one of its own M buckets according to m=Tid_r mod M for forwarding.

2. The method of claim 1, wherein each thread is assigned a respective arena, the arena being a data structure comprising a) a memory space from which the thread can allocate memory space for a performing a program task, and b) metadata recording which memory space is currently allocated.

3. The method of claim 2, wherein said memory space is a virtual memory space mapped from a physical memory space of one or more physical memory devices.

4. The method of claim 2, wherein each of the messages is a message requesting the receiving thread to deallocate a specified part of its allocated memory space.

5. The method of claim 1, wherein the batch transmission is triggered by a total number of messages in the buckets of the transmitting threat exceeding a threshold number.

6. The method of claim 1, wherein the batch transmission is triggered by a predetermined time period expiring.

7. The method of claim 1, wherein for each bucket of each transmitting thread, the messages to be transmitted from that bucket are assigned to the bucket in an order in which they become available for transmission; and wherein said one of the receiving threads in operation i) is the receiving thread to which the first message in the bucket is destined according to said order.

8. The method of claim 1, wherein the threads are scheduled by an operating system.

9. The method of claim 1, wherein the threads are threads of a distributed garbage collection system.

10. The method of claim 1, wherein the threads comprise different threads on a same processor core.

11. The method of claim 1, wherein the threads comprise threads on different processor cores.

12. The method of claim 11, wherein the threads comprise threads on different cores on the same die or Integrated Circuit (IC) package.

13. The method of claim 11, wherein the threads comprise threads on different Integrated Circuit (IC) packages in the same board.

14. The method of claim 11, wherein the threads comprise threads on different boards connected together in a same data center.

15. The method of claim 1, wherein the threads comprise threads on different devices connected together over widearea network.

16. The method of claim 15, wherein the network comprises the Internet, and/or a mobile cellular network.

17. The method of claim 16, wherein at least some of the devices take the form of wireless devices communicating with one another via said network, and each thread corresponds to the Internet Protocol (IP) address of a different one of the wireless devices.

18. One or more computer-readable storage devices comprising computer-executable instructions for communicating batched messages between threads, each thread having a thread identifier number (Tid), the computer-executable instructions when, executed by one or more processors, cause the one or more processors to perform the operations of:
  for each of the threads, defining a data structure comprising a plural number (M) of buckets having a sequential numbering (m);
  for each transmitting one of said threads, using its M buckets, wherein M is at least 2;
  each time the transmitting thread has a message to send or forward to any receiving one of said threads (Tid_r), assigning the message to the bucket numbered m=Tid_r mod M to await transmission, wherein Tid_r is the thread identifier number of the receiving thread;
  identifying the bucket numbered m=Tid_t mod M as a home bucket, wherein (Tid_t) is the thread identifier number of the transmitting thread; and
  after accumulating multiple messages in the buckets, performing a batch transmission comprising a plurality of successive phases (p) starting at p=0, each phase comprising:
    i) from each bucket other than the home bucket, transmitting some or all of the messages in the bucket as a batch to one of the receiving threads of the bucket based on the assignment of the bucket numbered m=Tid_r mod M, and
    ii) except in the last phase, incrementing the chase p by 1, and redistributing the messages remaining in the home bucket according to m=(Tid_r/M^p) mod M, wherein each receiving thread places any messages it receives not destined for itself into one of its own M buckets according to m=Tid_r mod M for forwarding.

19. A computer system for communicating batched messages between threads, each thread having a thread identifier number (Tid);
  the computer system comprising one or more processors an memory comprising one or more memory units arranged to store code arranged to run on the one or more processors, the code being configured so as when run to perform the operations of:
  for each of the threads, defining a data structure comprising a plural number (M) of buckets having a sequential numbering (m);
  for each transmitting one of said threats, using its M buckets, wherein M is at least 2;
  each time the transmitting thread has a message to send or for arc to any receiving one of said threads (Tid_r), assigning the message to the bucket numbered m=Tid_r mod M to await transmission, wherein Tid_r is the thread identifier number of the receiving thread;
  identifying the bucket numbered m=Tid_t mod M as a home bucket; wherein (Tid_t) is the thread identifier number of the transmitting thread; and
  after accumulating multiple messages in the buckets, performing a batch transmission comprising a plurality of successive phases (p) starting at p=0, each phase comprising:
    i) from each bucket other than the home bucket, transmitting some or all of the messages in the bucket as a batch to one of the receiving threads of the bucket based on the assignment of the bucket numbered m=Tid_r mod M, and ii) except in the last phase, incrementing the phase p by 1, and redistributing the messages remaining in the home bucket according to m=(Tid_r/M^p) mod M, wherein each receiving thread places any messages it receives not destined for itself into one of its own M buckets according to m=Tid_r mod M for forwarding.

* * * * *